April 20, 1948.   C. F. HILL ET AL   2,439,929
ELECTRICAL INSULATION
Filed June 17, 1942

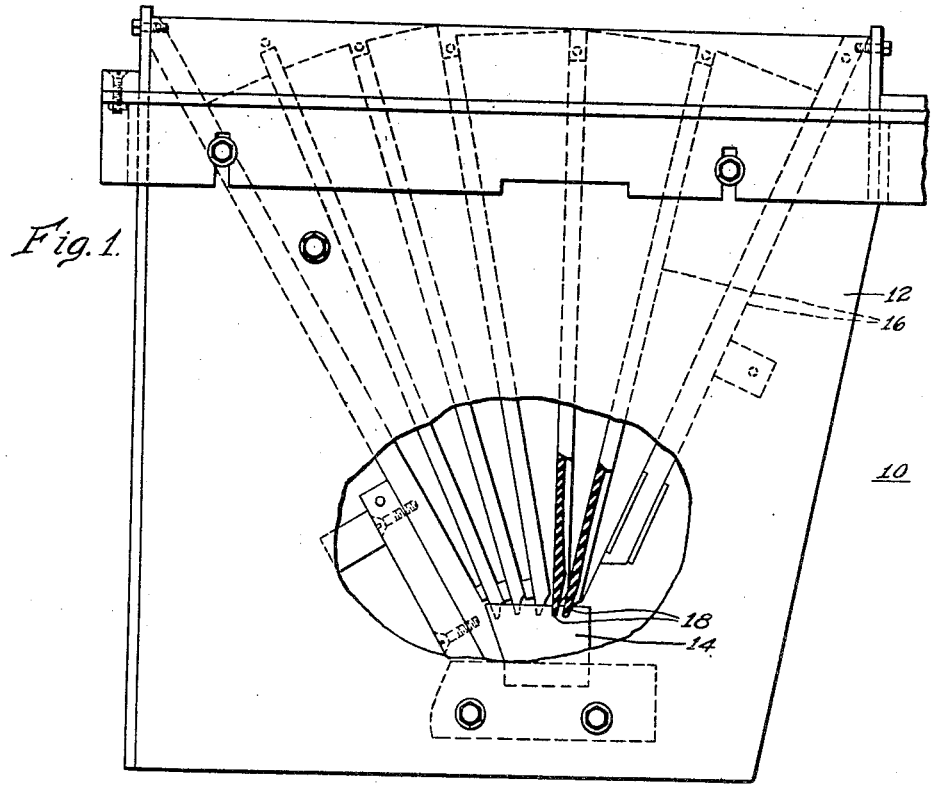
Fig. 1.

Fig. 2. — Surface Sheets Treated with Melamine Resin / Phenolic Resin Treated Body Sheets / Surface Sheets Treated with Melamine Resin

Fig. 3. — Melamine Resin Surface / Laminated Phenol Formaldehide Sheets / Melamine Resin Surface

Fig. 4. — All Melamine Resin Laminated Sheets

WITNESSES:

INVENTORS
Robert W. Auxier and
Charles F. Hill.
BY
ATTORNEY

Patented Apr. 20, 1948

2,439,929

UNITED STATES PATENT OFFICE 2,439,929

ELECTRICAL INSULATION

Charles F. Hill, Edgewood, and Robert W. Auxier, Forest Hills, Pa., assignors to Westinghouse Electric Corporation, East Pittsburgh, Pa., a corporation of Pennsylvania Application June 17, 1942, Serial No. 447,464

9 Claims. (Cl. 200—149)

This invention relates to electrical insulation, more particularly insulation capable of withstanding electrical arcs.

Various organic compositions have been employed alone or in combination with fibrous material as electrical insulation. When exposed to electrical arcs, many organic compositions are subject to breakdown resulting in the production of large quantities of gases. The destruction of the organic composition under these conditions is undesirable, since the insulation then fails mechanically.

In cases where organic insulation is subjected to arcing or flow of electrical current along the surfaces thereof, it frequently occurs that the organic substances decompose leaving a carbonaceous path. This phenomenon is known as "tracking." The carbonaceous path left by tracking is a relatively good conductor, and, therefore, the insulation having these carbonaceous tracks is no longer a good insulator. Current will readily flow along the carbonized path left by the previous electrical discharge to which the insulation had been subjected.

Under certain circumstances, the presence of moisture or dust or other foreign material upon the surface of electrical insulation will give rise to what is known as "creeping." In such cases, electrical current will flow along the surface of insulating members in spite of the relatively good insulating characteristics of the body of the insulation itself due to the presence of the foreign material on the surfaces. While electrical current is flowing along the surfaces, it may exert a deleterious effect upon the surface of the insulation. In some cases, the insulation will carbonize and become ineffective for its intended purpose.

In producing high-voltage apparatus, these defects of organic insulation as above described have become determinative of the failure or success of the apparatus. In some cases, it has been necessary to employ less advantageous inorganic insulating materials instead of the organic insulating materials which are not only more economical to prepare but are stronger and more adaptable to manufacturing than inorganic substitutes.

The object of this invention is to provide for organic electrical insulation which will not deteriorate under high voltage and arcing.

Another object of this invention is to provide for electrical insulation having good arc resistance whereby creeping and tracking at high voltage are reduced.

A further object of this invention is to provide for electrical insulation composed of melamine aldehyde resins present upon surface areas of the insulation which are subject to arcing to prevent creepage and tracking.

Other objects of the invention will in part be obvious and will in part appear hereinafter.

For a more complete understanding of the nature and objects of the invention, reference should be had to the specification and the figures of the drawing, in which:

Figure 1 is a partly broken plan view showing a form of circuit breaker employing certain features of the invention;

Fig. 2 is an end view of a plurality of sheets of material embodying the invention;

Fig. 3 is a sectional view of an insulating member embodying a modification of the invention; and Fig. 4 is a side elevation of a further modification of the invention.

According to this invention, it has been discovered that melamine resins are remarkably resistant to the influence of electrical discharges at or near the surface of the resinous material. Electrical arcs do not cause carbonization of the melamine resins under ordinary circumstances. It has been further discovered that insulating materials which are normally unsatisfactory when subjected to arcing or high voltage due to their surface characteristics, may be coated with the melamine resins and when so coated, the insulation exhibits greatly improved electrically insulating properties.

In producing the invention, it has been found most desirable to employ resins prepared from melamine reacted with aldehydes. A particularly good resin for electrical insulation is produced by reacting melamine and formaldehyde. Other aldehydes may be reacted with melamine to produce equally desirable material. Furthermore, melamine may be combined with varying quantities of formaldehyde reacting compounds such, for example, as thiourea and urea, preferably the major proportion being melamine and then the mixture reacted with an aldehyde to produce composite resinous materials suitable for the purpose of the invention.

Melamine may be reacted with an aldehyde in a reaction vessel in the presence of an alcohol according to well known chemical practice to produce a partially condensed product readily soluble in organic solvents. The condensed product may be dissolved in solvents of the benzenoid type to produce solutions of low viscosity suitable for treating fibrous material. Other methods of reacting melamine with aldehydes are known and may be used in producing a resin useful for the practice of the invention.

Paper, cloth, asbestos cloth, wood fibers, glass fibers and other synthetic and natural fibrous materials may be treated with the solution of melamine aldehyde. Upon drying the solution to remove the solvent, a deposit of melamine resin in a partially reacted state is deposited on the fibrous material. The melamine resin impregnated fibrous material may be put into molds alone or in combination with other resinous materials, preferably so arranging the materials that only the melamine resin is present at the surfaces to be subjected to electrical discharge and the whole consolidated under pressure and temperature for a period of time to produce a thermoset product.

Under some conditions, the partially reacted resin may be employed in the form of solid granules or as a powder or molding composition, combined with fibrous materials or not, as requirements demand. The pulverized, solid melamine resin may be subjected to elevated temperature and pressure in molds to produce predetermined shaped members.

The melamine resin sets to an infusible state in molding operations when subjected to temperatures of from 135° C. to 180° C. for brief periods of time, preferably at pressures of 1000 pounds per square inch and higher. When applied as a surface varnish, the melamine resins may be hardened to a thermoset state by the use of heat at temperatures of up to 500° C. for a few minutes.

Referring to Fig. 1 of the drawing, there is shown a fragmentary view, partly in section, of a circuit breaker structure 10, of a type such as has been successfully operated at ratings of 2,500,000 kv.-a. In the circuit breaker 10 a plurality of arc splitter plates 16 are maintained through the agency of plate 12 and other supporting members in a fan-shaped arrangement spreading out from a block 14 in which contact members are arranged and to which a conduit (not shown) carries a stream of compressed air. In block 14, electrical contact members carrying current of the order above specified at high voltage are separated during operation of breaker 10, thereby creating an arc of exceedingly high intensity. During separation of the arcing contacts a blast of compressed air is directed against the arc within block 14 so produced whereby the arc is blown against the tips 18 of the arc splitter plates 16. The arc is guided by the splitter plates 16 into the fan-shaped arrangement of spaces between plates 16 to such a distance that the arc breaks up into separate small sections and is extinguished.

In producing and operating the circuit breaker 10, it was found that the construction of the splitter plate 16 was extremely critical for continuous satisfactory operation. When phenol formaldehyde insulating materials, for example, were employed in the construction of the plates 16, it was discovered that the arc caused tracking, resulting in carbonized conducting surfaces forming on the splitter plate 16. In subsequent operations these conducting paths rendered the effective functioning of the apparatus difficult.

In other cases, fibrous material gave off large quantities of gas at the tips 18 which tended to oppose the entry of the arc between plates 16. Excessive gas formed by decomposition will prevent the breaking up of the arc into sections necessary for satisfactory breaker operation.

Arc splitter plates 16 have been produced with surfaces of melamine aldehyde resins and these have been satisfactorily employed in the circuit breaker 10 for numerous successful interruptions of high amperage current of the order of 40,000 amperes and higher. However this form of the invention lends itself best to insulating applications such as in the supporting members 12 and other parts not exposed to the full force of arcs of this strength. Referring to Fig. 2 of the drawing, there is illustrated one satisfactory form of electrical insulation which has lent itself to satisfactory use as in supports 12 or in splitter plates 16. The stack 20 of sheets of material is shown as it is formed prior to molding under pressure and temperature. The main body of the stack 20 consists of a number of sheets 22 of paper, cloth or the like treated with phenol formaldehyde resin. Disposed at the top and the bottom of the stack are a plurailty of sheets 24 treated with melamine aldehyde resin. The stack 20 when subjected to molding pressures and temperatures will fuse into a solid body having good mechanical and other physical characteristics. The surface sheets 24 impregnated with melamine aldehyde resin will not carbonize when subjected to arcing. Furthermore, the melamine resin will not tend to break down to produce undesirable quantities of gases to be given off by the splitter plates 16 under arcing conditions.

A second modification of the insulating materials which has proved to be satisfactory for the purpose of the invention is shown in Fig. 3. The insulating member 30 consists of a main body 34 of a laminated material, for example, sheets of cloth or asbestos cloth impregnated with phenol formaldehyde resin. The surface of the member 30 is coated with melamine resin 32 without any filler or strengthening material being present. A varnish of melamine resin may be painted onto the phenol formaldehyde body to give a predetermined thickness coating. In other cases, a preformed sheet of melamine resin may be applied to the phenol formaldehyde body and upon subjecting the whole to pressure at elevated temperatures, fusion and bonding will take place. In some instances, a solvent may be applied to the bonding face of the sheets of melamine resin 32 to provide for adhesive bonding of the stack of sheets.

It will be appreciated that in both Figs. 2 and 3 other resins than phenol formaldehyde may be employed in impregnating the body of the insulating material. The resin, however, should be such that it will bond to melamine resins and will be mechanically suitable for the required purpose.

For the most satisfactory operation the entire insulating member is preferably prepared from all melamine resin, as shown in Fig. 4. The member 40 of Fig. 4 consists of a plurality of sheets 42 of some fibrous material particularly asbestos or glass fiber fabric impregnated with melamine resin and consolidated under pressure and temperature. When exposed to high amperage arcs the tips 18 of the splitter part are subjected to an erosive or disintegrating action that removes a small amount of resin each time. All melamine resin splitters therefore will be more efficient than splitters consisting only partly of melamine resin.

An all melamine resin member may be molded from granulated or powdered molding composition including strengthening loose fibers.

The modifications of Figs. 2, 3 and 4 are exemplary of the invention and not exhaustive of the means of providing for good arc resistant insulation. Any practical method of depositing or distributing melamine resin on surfaces of members to be subjected to high voltage and arcing will be effective for producing the invention.

The term "melamine aldehyde resin" as employed in the specification and claims is intended to include additions to the melamine, for example, urea, as set forth hereinbefore, the whole being reacted with an aldehyde.

The melamine resin surface treatment is particularly advantageous for electrical insulating members, since the resin is quite resistant to moisture and water will not be absorbed in harmful amounts when the insulating material is exposed to the atmosphere. The unexpected resistance to tracking or carbonization when subjected to electrical current flow or arcs is the property of the melamine resins which renders their application and use for insulation in electrical apparatus more advantageous than that of other organic materials. An additional property of melamine which is of benefit for electrical uses is the relatively great fire resistance of melamine resins.

It is intended that all matter contained in the above description or in the accompanying drawing shall be taken as illustrative and not in a limiting sense.

We claim as our invention:

1. An arc splitter for use in circuit breakers and like devices subject to electrical arcs comprising a flat plate-like member having electrically insulating properties and a molded surface of substantial thickness of thermoset melamine-aldehyde resin applied to the member, the melamine-aldehyde resin being highly resistant to tracking of the surfaces when the insulation is subjected to arcs and resistant to creepage when subjected to electrical current the thickness of the melamine-aldehyde resin being sufficient to withstand the action of a great number of arcs.

2. Electrical insulation capable of use in the presence of arcs comprising a body composed of phenol-aldehyde type resin applied to a fibrous material and a surface application of substantial thickness of melamine-aldehyde resin, the whole cured under heat and pressure into a unitary structure characterized by great resistance to surface tracking when subjected to arcs and resistance to creepage, the thickness of the melamine-aldehyde resin being sufficient to withstand the action of a great number of arcs.

3. Electrical insulation capable of use in the presence of arcs comprising a body composed of phenol-aldehyde type resin applied to a fibrous material and a molded surface composed of melamine-aldehyde resin applied to a fibrous material to provide a layer of substantial thickness, the whole cured under heat and pressure into a unitary structure characterized by great resistance to surface tracking when subjected to arcs and resistance to creepage, the thickness of the melamine-aldehyde resin being sufficient to withstand the action of a great number of arcs.

4. Electrical insulation capable of use in the presence of arcs comprising a body composed of phenol-aldehyde type resin applied to an asbestos base fibrous material and a surface application of melamine-aldehyde resin, the whole cured under heat and pressure into a unitary structure characterized by great resistance to surface tracking when subjected to arcs and resistance to creepage.

5. Electrical insulation capable of use in the presence of arcs comprising a body composed of phenol-aldehyde type resin applied to an asbestos base and a surface layer of substantial thickness composed of melamine-aldehyde resin applied to an asbestos base fibrous material, the whole cured under heat and pressure into a unitary structure characterized by great resistance to surface tracking when subjected to arcs and resistance to creepage, the thickness of the melamine-aldehyde resin being sufficient to withstand the action of a great number of arcs.

6. Method of making an arc confining and extinguishing structure which comprises, moulding a mixture of melamine resin and inorganic filler to the desired shape and size under heat and pressure.

7. Method of making an arc confining and extinguishing structure which comprises, moulding a mixture of melamine resin and inorganic filler to the desired shape and size at a temperature of about 310° F. and under pressure ranging from about 1200 to about 2400 pounds per square inch.

8. A circuit interrupter comprising a pair of contact members adapted to form an arc, a plurality of arc splitters of plate form disposed adjacent the contact members and means for driving an arc formed between the contact members against edges of the arc splitters for extinguishing the arc, at least the surfaces of the arc splitters composed of a thermoset melamine aldehyde resin of a sufficient thickness to withstand the action of a great number of arcs driven thereagainst.

9. A circuit interrupter comprising a pair of contact members adapted to form an arc, a plurality of arc splitters of plate form disposed adjacent the contact members and means for driving an arc formed between the contact members against edges of the arc splitters for extinguishing the arc, the arc splitters composed of thermosetting melamine aldehyde resin and asbestos fibers distributed therein, the whole cured under heat and pressure into a unitary molded structure.

CHARLES F. HILL.
ROBERT W. AUXIER.

REFERENCES CITED

The following references are of record in the file of this patent:

UNITED STATES PATENTS

| Number | Name | Date |
| --- | --- | --- |
| 1,915,969 | Barringer | June 27, 1933 |
| 2,073,565 | Ruppel | Mar. 9, 1937 |
| 2,286,228 | Ripper | June 16, 1942 |
| 2,328,825 | McMahon | Sept. 7, 1943 |

FOREIGN PATENTS

| Number | Country | Date |
| --- | --- | --- |
| 490,688 | Great Britain | Aug. 19, 1938 |

OTHER REFERENCES

Modern Plastics, vol. 18, July 1941, pages 39, 40, 92.